United States Patent
Matsumura

(10) Patent No.: US 11,239,490 B2
(45) Date of Patent: Feb. 1, 2022

(54) METHOD FOR PRODUCING COMPOSITE PARTICLES FOR ELECTROCHEMICAL DEVICE ELECTRODE

(71) Applicant: ZEON CORPORATION, Tokyo (JP)

(72) Inventor: Taku Matsumura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 116 days.

(21) Appl. No.: 16/369,366

(22) Filed: Mar. 29, 2019

(65) Prior Publication Data

US 2019/0229368 A1 Jul. 25, 2019

Related U.S. Application Data

(63) Continuation of application No. 15/522,077, filed as application No. PCT/JP2015/079940 on Oct. 23, 2015, now abandoned.

(30) Foreign Application Priority Data

Nov. 21, 2014 (JP) .................................. 2014-236611

(51) Int. Cl.
| | | |
|---|---|---|
| *H01M 10/0525* | (2010.01) | |
| *H01G 11/24* | (2013.01) | |
| *H01G 11/38* | (2013.01) | |
| *H01G 11/50* | (2013.01) | |
| *H01M 4/13* | (2010.01) | |
| *H01G 11/42* | (2013.01) | |
| *H01G 11/86* | (2013.01) | |
| *H01M 4/62* | (2006.01) | |
| *H01M 4/02* | (2006.01) | |
| *H01M 4/525* | (2010.01) | |
| *H01M 4/587* | (2010.01) | |

(52) U.S. Cl.
CPC ........ *H01M 10/0525* (2013.01); *H01G 11/24* (2013.01); *H01G 11/38* (2013.01); *H01G 11/42* (2013.01); *H01G 11/50* (2013.01); *H01G 11/86* (2013.01); *H01M 4/13* (2013.01); *H01M 4/525* (2013.01); *H01M 4/587* (2013.01); *H01M 4/622* (2013.01); *H01M 2004/021* (2013.01); *H01M 2220/30* (2013.01)

(58) Field of Classification Search
CPC ...... H01M 10/0525; H01M 4/62; H01M 4/13; H01M 4/525; H01M 4/587; H01M 4/622; H01M 2004/021; H01M 2220/30; H01G 11/38; H01G 11/50; H01G 11/86; H01G 11/24; H01G 11/42; Y02E 60/13; Y02E 60/10

See application file for complete search history.

(56) References Cited

U.S. PATENT DOCUMENTS

2009/0224198 A1* 9/2009 Mori .................. H01M 4/0404
252/62.3 Q

FOREIGN PATENT DOCUMENTS

| JP | 2001176757 A | 6/2001 |
| JP | 2004247249 A | 9/2004 |

OTHER PUBLICATIONS

May 23, 2017, International Preliminary Report on Patentability issued in the International Patent Application No. PCT/JP2015/079940.

Nov. 6, 2018, the Extended European Search Report issued by the European Patent Office in the corresponding European Patent Application No. 15861091.5.

* cited by examiner

*Primary Examiner* — Kwang Han
(74) *Attorney, Agent, or Firm* — Kenja IP Law PC

(57) ABSTRACT

A method for producing composite particles for an electrochemical device electrode is provided. The composite particles include an electrode active material and 0.1 to 10 parts by weight of a binder relative to 100 parts by weight of the electrode active material based on a dry weight, the binder having a glass transition temperature of −30 to 30° C. Tha method comprises a step of adjusting a cumulative 10% diameter (D10 diameter) of the composite particles to 20 μm or more and 100 μm or less in a particle diameter distribution in terms of a volume. The composite particles as a powder have a pressure loss of 5.0 mbar or less and a dynamic repose angle of 20° or more and less than 40°.

6 Claims, No Drawings

METHOD FOR PRODUCING COMPOSITE PARTICLES FOR ELECTROCHEMICAL DEVICE ELECTRODE

CROSS-REFERENCE TO RELATED APPLICATIONS

This application is a continuation application of U.S. application Ser. No. 15/522,077 filed Apr. 26, 2017, which is a National Stage Application of PCT/JP2015/079940 filed Oct. 23, 2015, which claims priority based on Japanese Patent Application No. 2014-236611 filed Nov. 21, 2014. The disclosures of the prior applications are hereby incorporated by reference herein in their entirety.

TECHNICAL FIELD

The present invention relates to composite particles for an electrochemical device electrode.

BACKGROUND ART

An electrochemical device such as a lithium ion secondary battery having a small size, a light weight, and a high energy density, and capable of being charged and discharged repeatedly or an electric double layer capacitor is expected to expand demand thereof in the future also due to environmental reasons. The lithium ion secondary battery has a high energy density, and has been utilized in a field of a cellular phone, a notebook type personal computer, or the like. The electric double layer capacitor can be charged and discharged rapidly, and has been utilized as a memory backup small power supply for a personal computer or the like. In addition, a lithium ion capacitor utilizing an oxidation-reduction reaction (pseudo electric double layer capacity) on a surface of a metal oxide or a conductive polymer has attracted attention due to the magnitude of the capacity. Further improvement of performance of these electrochemical devices, such as a lower resistance or a larger capacity has been demanded with expansion or development of applications.

While expectation for these electrochemical devices increases, further improvement of these electrochemical devices, such as a lower resistance, a larger capacity, or improvement of a mechanical characteristic or productivity has been demanded with expansion or development of applications. In such a situation, also as for an electrochemical device electrode, a more productive manufacturing method has been demanded.

The electrochemical device electrode is usually obtained by laminating an electrode active material layer formed by binding an electrode active material and a conductive material optionally used with a binder on a current collector. Examples of the electrochemical device electrode include an applied electrode manufactured by a method for applying a slurry for an applied electrode containing an electrode active material, a binder, a conductive material, or the like onto a current collector, and removing a solvent with heat or the like. However, it is difficult to manufacture a uniform electrochemical device due to migration of the binder or the like. In addition, in this method, cost is high, a working environment is poor, and a manufacturing apparatus tends to be large.

In contrast, as a method for manufacturing an electrochemical device electrode, a method for spray-drying an electrode composition slurry containing an electrode active material, a conductive material, and a binder into a powder, and subjecting the powder to pressure molding to obtain an electrode has been proposed (for example, refer to Patent Literature 1).

However, composite particles obtained by the method of Patent Literature 1 contain small particles having a large adhesive force, so that flowability is therefore deteriorated. Thus, it is difficult to prepare an electrochemical device electrode having a high film thickness precision using these composite particles. In addition, an electrolytic solution does not easily permeate an electrode obtained using such composite particles, and battery performance such as a capacity is deteriorated when a battery is manufactured using the electrode.

CITATION LIST

Patent Literature

Patent Literature 1: JP 2004-247249 A

SUMMARY OF INVENTION

Technical Problem

An object of the present invention is to provide composite particles for an electrochemical device electrode, capable of forming an electrode having an excellent film thickness precision and electrolytic solution injection property.

Solution to Problem

The present inventor made intensive studies. As a result, the present inventor has found that an electrode having an excellent film thickness precision and electrolytic solution injection property can be formed by using composite particles having a low pressure loss when a composite particle layer is formed and a dynamic repose angle within a predetermined range.

That is, the present invention provides:

(1) composite particles for an electrochemical device electrode, containing an electrode active material and a binder, in which a composite particle layer formed of the composite particles has a pressure loss of 5.0 mbar or less and a dynamic repose angle of 20° or more and less than 40°;

(2) the composite particles for an electrochemical device electrode according to (1), containing a water-insoluble polysaccharide polymer fiber; and (3) the composite particles for an electrochemical device electrode according to (1) or (2), in which a cumulative 10% diameter (D10 diameter) is 20 μm or more and 100 μm or less in a particle diameter distribution in terms of a volume.

Advantageous Effects of Invention

The present invention provides composite particles for an electrochemical device electrode, capable of forming an electrode having an excellent film thickness precision and electrolytic solution injection property.

DESCRIPTION OF EMBODIMENTS

Hereinafter, an embodiment of the present invention will be described. Composite particles for an electrochemical device electrode (hereinafter, also referred to as "composite particles") according to the present invention contain an electrode active material and a binder, characterized in that a composite particle layer formed of the composite particles has a pressure loss of 5.0 mbar or less and a dynamic repose angle of 20° or more and less than 40°.

Note that hereinafter, "positive electrode active material" means an electrode active material for a positive electrode, and "negative electrode active material" means an electrode active material for a negative electrode. In addition, "positive electrode active material layer" means an electrode active material layer disposed in a positive electrode, and "negative electrode active material layer" means an electrode active material layer disposed in a negative electrode.

(Electrode Active Material)

When the electrochemical device is a lithium ion secondary battery, an active material to which a lithium ion can be doped or from which a lithium ion can be dedoped is used as a positive electrode active material, and is roughly classified into an active material formed of an inorganic compound and an active material formed of an organic compound.

Examples of the positive electrode active material formed of an inorganic compound include a transition metal oxide, a transition metal sulfide, and a lithium-containing composite metal oxide formed of lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, and $V_6O_{13}$. Among these oxides, MnO, $V_2O_5$, $V_6O_{13}$, and $TiO_2$ are preferable due to cycle stability and capacity. Examples of the transition metal sulfide include $TiS_2$, $TiS_3$, amorphous $MoS_2$, and FeS. Examples of the lithium-containing composite metal oxide include a lithium-containing composite metal oxide having a layered structure, a lithium-containing composite metal oxide having a spinel structure, and a lithium-containing composite metal oxide having an olivine structure.

Examples of the lithium-containing composite metal oxide having a layered structure include lithium-containing cobalt oxide ($LiCoO_2$), lithium-containing nickel oxide ($LiNiO_2$), Co—Ni—Mn lithium composite oxide, Ni—Mn—Al lithium composite oxide, and Ni—Co—Al lithium composite oxide. Examples of the lithium-containing composite metal oxide having a spinel structure include lithium manganate ($LiMn_2O_4$) and Li [$Mn_{3/2}M_{1/2}$]$O_4$ (here, M is Cr, Fe, Co, Ni, Cu, or the like) in which a part of Mn is replaced with another transition metal. Examples of the lithium-containing composite metal oxide having an olivine structure include an olivine type lithium phosphate compound represented by $Li_xMPO_4$ (in the formula, M is at least one selected from the group consisting of Mn, Fe, Co, Ni, Cu, Mg, Zn, V, Ca, Sr, Ba, Ti, Al, Si, B, and Mo, $0 \leq X \leq 2$).

Examples of the organic compound include a conductive polymer such as polyacetylene or poly-p-phenylene. An iron oxide having poor electrical conductivity may be used as a positive electrode active material covered with a carbon material by presence of a carbon source material during reduction firing. These compounds may be those which have been subjected to partial elemental substitution. The positive electrode active material may be a mixture of the inorganic compound and the organic compound.

When the electrochemical device is a lithium ion capacitor, the positive electrode active material is only required to be able to support a lithium ion and an anion such as tetrafluoroborate reversibly. Specifically, an allotrope of carbon can be preferably used, and an electrode active material used in an electric double layer capacitor can be widely used. Specific examples of the allotrope of carbon include activated carbon, polyacene (PAS), carbon whisker, a carbon nanotube, and graphite.

When the electrochemical device is a lithium ion secondary battery, examples of a negative electrode active material include a substance capable of transferring an electron in a negative electrode of the electrochemical device. When the electrochemical device is a lithium ion secondary battery, a substance capable of occluding or releasing lithium can be usually used as a negative electrode active material.

Examples of the negative electrode active material preferably used for a lithium ion secondary battery include a carbonaceous material such as amorphous carbon, graphite, natural graphite, meso carbon microbeads, or a pitch carbon fiber; a conductive polymer such as polyacene; a metal such as silicon, tin, zinc, manganese, iron, or nickel, and an alloy thereof; oxides or sulfates of the metals or alloys; metal lithium; a lithium alloy such as Li—Al, Li—Bi—Cd, or Li—Sn—Cd; a lithium transition metal nitride; and silicon. As the negative electrode active material, a product obtained by attaching a conductive material to a surface of particles of the negative electrode active material, for example, by a mechanical modifying method may be used. The negative electrode active material may be used singly or in combination of two or more kinds thereof at any ratio.

When the electrochemical device is a lithium ion capacitor, preferable examples of a negative electrode active material include a negative electrode active material formed of the above carbon.

The content of an electrode active material in an electrode active material layer is preferably from 90 to 99.9% by weight, and more preferably from 95 to 99% by weight from a viewpoint of increasing the capacity of a lithium ion secondary battery and improving a flexibility of an electrode and a binding property between a current collector and the electrode active material layer.

A volume average particle diameter of the electrode active material is preferably from 1 to 50 μm, and more preferably from 2 to 30 μm from a viewpoint of reducing the blending amount of a binder in preparing a composite particle slurry and suppressing lowering in capacity of a battery, and from a viewpoint of making it easy to prepare a composite particle slurry with a suitable viscosity for spraying the slurry and obtaining a uniform electrode.

(Binder)

A binder used in the present invention is not particularly limited as long as being able to bind the above electrode active materials to each other. As the binder, a dispersion type binder having a property of dispersed in a solvent can be preferably used.

Examples of the dispersion type binder include a polymer compound such as a silicon polymer, a fluorine-containing polymer, a conjugated diene polymer, an acrylate polymer, polyimide, polyamide, or polyurethane. Preferable examples thereof include a fluorine-containing polymer, a conjugated diene polymer, and an acrylate polymer. More preferable examples thereof include a conjugated diene polymer and an acrylate polymer. These polymers can be used singly or in combination of two or more kinds thereof as the dispersion type binder.

The fluorine-containing polymer includes a monomer unit containing a fluorine atom. Specific examples of the fluorine-containing polymer include polytetrafluoroethylene, polyvinylidene fluoride (PVDF), a tetrafluoroethylene-perfluoroalkyl vinyl ether copolymer, an ethylene-tetrafluoroethylene copolymer, an ethylene-chlorotrifluoroethylene copolymer, and a perfluoroethylene-propene copolymer. Among these polymers, PVDF is preferably contained.

Examples of the conjugated diene polymer include a homopolymer of a conjugated diene monomer, a copolymer obtained by polymerizing a monomer mixture containing a conjugated diene monomer, and a hydrogenated product thereof. Preferable examples of the conjugated diene monomer include 1,3-butadiene, 2-methyl-1,3-butadiene, 2,3-dimethyl-1,3-butadiene, 2-chloro-1,3-butadiene, a substituted and linear conjugated pentadiene, and a substituted and branched conjugated hexadiene. 1,3-butadiene is more preferably used because a flexibility can be improved and resistance to cracking can be high when an electrode is formed. The monomer mixture may contain two or more kinds of the conjugated diene monomers.

When the conjugated diene polymer is a copolymer of the conjugated diene monomer and a monomer copolymerizable therewith, examples of the copolymerizable monomer include an α,β-unsaturated nitrile compound and a vinyl compound containing an acid component.

Specific examples of the conjugated diene polymer include a conjugated diene monomer homopolymer such as polybutadiene or polyisoprene; an aromatic vinyl monomer-conjugated diene monomer copolymer which may be carboxy-modified, such as a styrene-butadiene copolymer (SBR); a vinyl cyanide monomer-conjugated diene monomer copolymer such as an acrylonitrile-butadiene copolymer (NBR); hydrogenated SBR, and hydrogenated NBR.

A ratio of a conjugated diene monomer unit in the conjugated diene polymer is preferably from 20 to 60% by weight, and more preferably from 30 to 55% by weight. A too large ratio of the conjugated diene monomer unit tends to lower resistance to an electrolytic solution when an electrode is manufactured using composite particles containing a binder. A too small ratio of the conjugated diene monomer unit tends to obtain an insufficient adhesion between composite particles and a current collector.

The acrylate polymer is a polymer including a monomer unit derived from a compound [(meth)acrylic acid ester] represented by general formula (1): $CH_2=CR^1—COOR^2$ (in the formula, $R^1$ represents a hydrogen atom or a methyl group, $R^2$ represents an alkyl group or a cycloalkyl group, and $R^2$ may further have an ether group, a hydroxyl group, a phosphate acid group, an amino group, a carboxyl group, a fluorine atom, or an epoxy group), and is specifically a homopolymer of the compound represented by general formula (1) or a copolymer obtained by polymerizing a monomer mixture containing the compound represented by general formula (1). Specific examples of the compound represented by general formula (1) include a (meth)acrylic acid alkyl ester such as methyl (meth)acrylate, ethyl (meth)acrylate, propyl (meth)acrylate, isopropyl (meth)acrylate, n-butyl (meth)acrylate, isobutyl (meth) acrylate, cyclohexyl (meth) acrylate, 2-ethylhexyl (meth)acrylate, isopentyl (meth)acrylate, isooctyl (meth)acrylate, isobornyl (meth) acrylate, isodecyl (meth)acrylate, lauryl (meth)acrylate, stearyl (meth)acrylate, or tridecyl (meth)acrylate; an ether group-containing (meth)acrylic acid ester such as butoxyethyl (meth)acrylate, ethoxy diethylene glycol (meth)acrylate, methoxy dipropylene glycol (meth)acrylate, methoxy polyethylene glycol (meth)acrylate, phenoxy ethyl (meth) acrylate, or tetrahydrofurfuryl (meth)acrylate; a hydroxyl group-containing (meth)acrylic acid ester such as 2-hydroxy ethyl (meth)acrylate, 2-hydroxypropyl (meth)acrylate, 2-hydroxy-3-phenoxypropyl (meth)acrylate, or 2-(meth)acryloyloxyethyl-2-hydroxyethyl phthalate; a carboxylic acid-containing (meth)acrylic acid ester such as 2-(meth) acryloyloxyethyl phthalate or 2-(meth)acryloyloxyethyl phthalate; a fluorine group-containing (meth)acrylic acid ester such as perfluorooctyl ethyl (meth)acrylate; a phosphate acid group-containing (meth) acrylic acid ester such as ethyl (meth)acrylate phosphate; an epoxy group-containing (meth)acrylic acid ester such as glycidyl (meth)acrylate; and an amino group-containing (meth)acrylic acid ester such as dimethylaminoethyl (meth) acrylate.

Note that here, "(meth)acrylic" means "acrylic" and "methacrylic". In addition, "(meth)acryloyl" means "acryloyl" and "methacryloyl".

These (meth)acrylic acid esters can be used singly or in combination of two or more kinds thereof. Among these (meth)acrylic acid esters, a (meth)acrylic acid alkyl ester is preferable. Methyl (meth)acrylate, ethyl (meth)acrylate, n-butyl (meth)acrylate, and a (meth)acrylic acid alkyl ester having 6 to 12 carbon atoms in the alkyl group are more preferable. By selecting these (meth)acrylates, a swelling property to an electrolytic solution can be lowered, and a cycle characteristic can be improved.

When the acrylate polymer is a copolymer of the compound represented by general formula (1) and a monomer copolymerizable therewith, examples of the copolymerizable monomer include a carboxylate having two or more carbon-carbon double bonds, an aromatic vinyl monomer, an amide monomer, an olefin, a diene monomer, a vinyl ketone, a heterocyclic ring-containing vinyl compound, an α,β-unsaturated nitrile compound, and a vinyl compound containing an acid component.

Among the copolymerizable monomers, an aromatic vinyl monomer is preferably used because an electrode which is hardly deformed and has a high strength can be manufactured, and a sufficient adhesion between an electrode active material layer and a current collector can be obtained. Examples of the aromatic vinyl monomer include styrene.

Note that a too large ratio of the aromatic vinyl monomer tends to obtain an insufficient adhesion between an electrode active material layer and a current collector. A too small ratio of the aromatic vinyl monomer tends to lower resistance to an electrolytic solution when an electrode is manufactured.

A ratio of a (meth)acrylic acid ester unit in the acrylate polymer is preferably from 50 to 95% by weight, and more preferably from 60 to 90% by weight from a viewpoint of improving a flexibility and enhancing resistance to cracking when an electrode is formed.

Examples of the α,β-unsaturated nitrile compound used for a polymer constituting the dispersion type binder include acrylonitrile, methacrylonitrile, α-chloroacrylonitrile, and α-bromoacrylonitrile. These compounds can be used singly or in combination of two or more kinds thereof. Among these compounds, acrylonitrile and methacrylonitrile are preferable, and acrylonitrile is more preferable.

A ratio of an α,β-unsaturated nitrile compound unit in the dispersion type binder is preferably from 0.1 to 40% by weight, more preferably from 0.5 to 30% by weight, and still more preferably from 1 to 20% by weight. When the dispersion type binder contains the α,β-unsaturated nitrile compound unit, an electrode which is hardly deformed and has a high strength can be manufactured. In addition, when the dispersion type binder contains the α,β-unsaturated nitrile compound unit, a sufficient adhesion between an electrode active material layer containing composite particles and a current collector can be obtained.

Note that a too large ratio of the α,β-unsaturated nitrile compound unit tends to obtain an insufficient adhesion between an electrode active material layer and a current collector. A too small ratio of the α,β-unsaturated nitrile compound unit tends to lower resistance to an electrolytic solution when an electrode is manufactured.

Examples of the vinyl compound containing an acid component include acrylic acid, methacrylic acid, itaconic acid, maleic acid, and fumaric acid. These compounds can be used singly or in combination of two or more kinds thereof. Among these compounds, acrylic acid, methacrylic acid, and itaconic acid are preferable, and methacrylic acid is more preferable due to an excellent adhesive force.

A ratio of a vinyl compound unit containing an acid component in the dispersion type binder is preferably from 0.5 to 10% by weight, more preferably from 1 to 8% by weight, and still more preferably from 2 to 7% by weight from a viewpoint of improving stability when a composite particle slurry is prepared.

Note that a too large ratio of the vinyl compound unit containing an acid component tends to increase the viscosity of a composite particle slurry to make handling difficult. A too small ratio of the vinyl compound unit containing an acid component tends to lower stability of a composite particle slurry.

The shape of the dispersion type binder is not particularly limited, but is preferably a particulate shape. Due to the particulate shape, an excellent binding property can be obtained, and lowering in a capacity or deterioration caused by repetition of charging and discharging in a manufactured electrode can be suppressed. Examples of the particulate binder include a binder in which binder particles are dispersed in water, such as a latex, and a powdery binder obtained by drying such a dispersion liquid.

An average particle diameter of the dispersion type binder is preferably from 0.001 to 10 μm, more preferably from 10 to 5000 nm, and still more preferably from 50 to 1000 nm because an obtained electrode has an excellent strength and flexibility while stability of a prepared composite particle slurry is excellent.

A method for manufacturing the binder used in the present invention is not particularly limited, but a known polymerization method such as an emulsion polymerization method, a suspension polymerization method, a dispersion polymerization method, or a solution polymerization method can be employed. Among these methods, the emulsion polymerization method is preferable because it is easy to control a particle diameter of the binder. The binder used in the present invention may be particles having a core-shell structure obtained by polymerizing a mixture of two or more kinds of monomers in stages.

The blending amount of the binder in the composite particles of the present invention is from 0.1 to 10 parts by weight, preferably from 0.5 to 8 parts by weight, and more preferably from 1 to 5 parts by weight relative to 100 parts by weight of an electrode active material based on a dry weight. A too large blending amount of the binder deteriorates flowability, and increases a dynamic repose angle of the composite particles. A too small blending amount of the binder lowers an adhesive force.

The glass transition temperature (Tg) of the binder used in the present invention is preferably from −30 to 30° C. A too low value of Tg of the binder deteriorates flowability of obtained composite particles, and increases a dynamic repose angle of the composite particles. A too high value of Tg of the binder makes flowability of obtained composite particles too high, and therefore it is difficult to obtain an electrode active material layer by pressure molding.

(Water-Insoluble Polysaccharide Polymer Fiber)

A water-insoluble polysaccharide polymer fiber used in the present invention is a fiber (short fiber) obtained by fibrillation with a mechanical shearing force. Note that the water-insoluble polysaccharide polymer fiber used in the present invention is a polysaccharide polymer fiber having an insoluble content of 90% by weight or more by dissolving 0.5 g of a polysaccharide polymer fiber in 100 g of water at 25° C.

As the water-insoluble polysaccharide polymer fiber, a polysaccharide polymer nanofiber is preferably used, and a single substance selected from bionanofibers derived from organisms, such as a cellulose nanofiber, a chitin nanofiber, or a chitosan nanofiber, or any mixture thereof is preferably used from a viewpoint of a high reinforcing effect of composite particles due to a high flexibility and a high strength among the polysaccharide polymer nanofibers.

Examples of a method for fibrillation (making a fiber shorter) by applying a mechanical shearing force to the water-insoluble polysaccharide polymer fiber include a method for dispersing the water-insoluble polysaccharide polymer fiber in water and then beating the resulting dispersion or causing the resulting dispersion to pass through an orifice. As the water-insoluble polysaccharide polymer fiber, short fibers having various fiber diameters are commercially available, and may be dispersed in water to be used.

An average fiber diameter of the water-insoluble polysaccharide polymer fiber used in the present invention is preferably from 5 to 3000 nm, more preferably from 5 to 2000 nm, still more preferably from 5 to 1000 nm, and particularly preferably from 5 to 100 nm from a viewpoint of obtaining sufficient strengths of composite particles and an electrode and from a viewpoint of obtaining an excellent electrochemical characteristic of an obtained electrochemical device due to formation of a uniform electrode active material layer. A too large average fiber diameter of the water-insoluble polysaccharide polymer fiber makes sufficient presence of the water-insoluble polysaccharide polymer fiber in composite particles impossible, and therefore a sufficient strength of the composite particles cannot be obtained. In addition, flowability of the composite particles is deteriorated, and it is difficult to form a uniform electrode active material layer.

Note that the water-insoluble polysaccharide polymer fiber may be formed of single fibers which are not arranged but are sufficiently apart from each other. In this case, the average fiber diameter is an average diameter of the single fibers. The water-insoluble polysaccharide polymer fiber may be formed of a yarn obtained by assembling a plurality of single fibers in a bundle. In this case, the average fiber diameter is defined as an average value of diameters of the yarns.

A polymerization degree of the water-insoluble polysaccharide polymer fiber is preferably from 50 to 1000, and more preferably from 100 to 600 from a viewpoint of obtaining sufficient strengths of composite particles and an electrode and from a viewpoint of an excellent electrochemical characteristic of an obtained electrochemical device due to formation of a uniform electrode active material layer. A too large polymerization degree of the water-insoluble polysaccharide polymer fiber increases an internal resistance of an obtained electrochemical device. In addition, it is difficult to form a uniform electrode active material layer. A too small polymerization degree of the water-insoluble polysaccharide polymer fiber makes the strength of the composite particles insufficient.

The blending amount of the water-insoluble polysaccharide polymer fiber is preferably from 0.2 to 4 parts by weight, more preferably from 0.5 to 4 parts by weight, still more preferably from 1 to 3 parts by weight, and particularly preferably from 1 to 2 parts by weight relative to 100 parts by weight of the composite particles. A too large blending amount of the water-insoluble polysaccharide polymer fiber increases an internal resistance of an obtained electrochemical device. In addition, it is difficult to form a uniform electrode layer (electrode active material layer). A too small blending amount of the water-insoluble polysaccharide polymer fiber makes the strength of the composite particles insufficient. Note that the viscosity can be appropriately adjusted by reducing the blending amount of a water-soluble polymer described below when the viscosity of the composite particle slurry is increased by an increase in the blending amount of the water-insoluble polysaccharide polymer fiber.

(Water-Soluble Polymer)

A water-soluble polymer may be used for the composite particles, as necessary. Specific examples of the water-soluble polymer include a cellulose polymer such as carboxymethylcellulose, methylcellulose, ethylcellulose, or hydroxypropylcellulose, an ammonium salt or an alkali metal salt thereof, an alginic acid ester such as an alginic acid propylene glycol ester, an alginate such as sodium alginate, polyacrylic acid, a polyacrylate (or methacrylate) such as sodium polyacrylate (or methacrylate), polyvinyl alcohol, modified polyvinyl alcohol, polyethyleneoxide, polyvinyl pyrrolidone, polycarboxylic acid, oxidized starch, starch phosphate, casein, various modified starch, chitin, and a chitosan derivative. These water-soluble polymers can be used singly or in combination of two or more kinds thereof. Among these water-soluble polymers, a cellulose polymer is preferable, and carboxymethylcellulose, an ammonium salt, or an alkali metal salt thereof is particularly preferable. The blending amount of these water-soluble polymers is not particularly limited as long as being within a range not impairing the effect of the present invention, but is usually from 0.1 to 10 parts by weight, preferably from 0.5 to 5 parts by weight, and more preferably from 0.8 to 2 parts by weight relative to 100 parts by weight of an electrode active material.

When the composite particles are manufactured by a spray solidification granulation method described below, an anionic water-soluble polymer is preferable as the water-soluble polymer from a viewpoint of easily solidifying a sprayed composite particle slurry and obtaining spherical composite particles, and from a viewpoint of making bonding of the composite particles to one another after solidification difficult. Here, the anionic water-soluble polymer contains at least an anionic group. Examples of the anionic group include a carboxyl group, a sulfo group, and a phospho group.

Preferable examples of such an anionic water-soluble polymer include alginic acid; an alkali metal salt of alginic acid (sodium alginate, potassium alginate, or the like) and a water-soluble derivative of alginic acid such as ammonium alginate; a cellulose polymer such as hydroxyethylmethyl cellulose, hydroxypropylmethyl cellulose, or carboxymethylcellulose; polyacrylic acid, a derivative of polyacrylic acid, a polysulfonic acid polymer, polyacrylamide, agar, gelatin, carrageenan, glucomannan, pectin, curdlan, and gellan gum. Carboxymethyl cellulose, alginic acid, a water-soluble derivative of alginic acid, polyacrylic acid, and a derivative of polyacrylic acid are more preferable. Alginic acid and a water-soluble derivative of alginic acid are still more preferable. Alginic acid and an alkali metal salt of alginic acid (sodium alginate, potassium alginate, or the like) are further still more preferable. Note that these water-soluble polymers may be used singly, but a strength can be imparted to the composite particles by using a combination of a plurality of water-soluble polymers. Furthermore, a combination of two or more polymers having different structures can be used among the anionic water-soluble polymers in the same kind (category).

When the composite particles of the present invention are manufactured by a spray solidification granulation method described below, the blending amount of the water-soluble polymer in the composite particles is usually from 0.4 to 10 parts by weight, preferably from 0.7 to 5 parts by weight, and more preferably from 1 to 2 parts by weight relative to 100 parts by weight of an electrode active material from a viewpoint of solidifying a slurry firmly and obtaining composite particles having excellent shapes. A too large blending amount of the water-soluble polymer increases a resistance of an obtained electrochemical device. A too small blending amount of the water-soluble polymer may make solidification of a composite particle slurry difficult or may make obtained composite particles brittle.

(Conductive Material)

The composite particles of the present invention may contain a conductive material, as necessary. Preferable examples of the conductive material used as necessary include a conductive carbon such as furnace black, acetylene black (hereinafter, also abbreviated as "AB"), Ketjen Black (trademark of Akzo Nobel Chemicals Besloten Vennootschap Corporation), carbon nanotube, carbon nanohorn, or graphene. Among these conductive materials, acetylene black is more preferable. An average particle diameter of the conductive material is not particularly limited, but is preferably smaller than that of the electrode active material, and is preferably from 0.001 to 10 µm, more preferably from 0.005 to 5 µm, and still more preferably from 0.01 to 1 µm from a viewpoint of exhibiting a sufficient conductivity with a smaller use amount.

When the conductive material is added, the blending amount thereof is preferably from 1 to 10 parts by weight, and more preferably from 1 to 5 parts by weight relative to 100 parts by weight of an electrode active material.

(Other Additives)

The composite particles of the present invention may further contain another additive, as necessary. Examples of the other additive include a surfactant. Examples of the surfactant include an anionic surfactant, a cationic surfactant, a nonionic surfactant, and an amphoteric surfactant such as a nonionic anion. Among these surfactants, an anionic or nonionic surfactant is preferable. The blending amount of the surfactant is not particularly limited, but is preferably from 0 to 50 parts by weight, more preferably from 0.1 to 10 parts by weight, and still more preferably from 0.5 to 5 parts by weight relative to 100 parts by weight of the electrode active material in the composite particles. By addition of the surfactant, a surface tension of a droplet obtained from a composite particle slurry can be adjusted.

(Method for Manufacturing Composite Particles)

The composite particles of the present invention include an electrode active material and a binder. Each of the electrode active material and the binder is not present as an independent particle, but two or more components containing the electrode active material and the binder as constituent components form one particle. Specifically, a plurality of particles forms a secondary particle while each of the particles containing two or more components substantially maintains the shape thereof. A plurality of (preferably several to several thousands of) particles of the electrode active material are preferably bonded to one another with the binder to form a particle.

A method for manufacturing the composite particles is not particularly limited. The composite particles can be obtained by a manufacturing method such as a spray drying granulation method, a spray solidification granulation method, a rolling bed granulation method, a compression type granulation method, a stirring type granulation method, an extrusion granulation method, a crushing type granulation method, a fluidized bed granulation method, a fluidized bed multifunctional granulation method, or a melt granulation method.

As the method for manufacturing the composite particles, it is only required to select an optimum method appropriately according to a component of the composite particles or the like from a viewpoint of easiness of controlling a particle diameter, productivity, easiness of controlling a particle diameter distribution, or the like. However, the spray drying granulation method and the spray solidification granulation method are preferable. The spray drying granulation method is more preferable because the composite particles can be manufactured relatively easily.

(Spray Drying Granulation Method)

When the composite particles are manufactured by the spray drying granulation method, first, a composite particle slurry (hereinafter, also referred to as "slurry") containing an electrode active material and a binder, and a water-insoluble polysaccharide polymer fiber, a water-soluble polymer, and a conductive material added as necessary is prepared. The composite particle slurry can be prepared by dispersing or dissolving an electrode active material and a binder, and a water-insoluble polysaccharide polymer fiber, a water-soluble polymer, and a conductive material added as necessary in a solvent. Note that in this case, a binder dispersed in a solvent can be added in a state of being dispersed in the solvent.

As the solvent used to obtain a composite particle slurry, water is preferably used. However, a mixed solvent of water and an organic solvent may be used, or only an organic solvent may be used singly or in combination of several kinds thereof. Examples of the organic solvent which can be used in this case include an alcohol such as methyl alcohol, ethyl alcohol, or propyl alcohol; an alkyl ketone such as acetone or methyl ethyl ketone; an ether such as tetrahydrofuran, dioxane, or diglyme; and an amide such as diethylformamide, dimethyl acetamide, N-methyl-2-pyrrolidone, or dimethyl imidazolidinone. When an organic solvent is used, an alcohol is preferable. By using water together with an organic solvent having a boiling point lower than that of water, a drying speed can be increased during spray drying. In addition, the viscosity or flowability of the composite particle slurry can be thereby adjusted, and a production efficiency can be improved.

The viscosity of the composite particle slurry is preferably from 10 to 3,000 mPa·s, more preferably from 30 to 1,500 mPa·s, and still more preferably from 50 to 1,000 mPa·s at room temperature from a viewpoint of improving granulation productivity of the composite particles by spray drying.

Note that, a viscosity described in this description is a value at 25° C. at a shearing speed of 10 s$^{-1}$. A viscosity can be measured using a Brookfield digital viscometer DV-II+ Pro.

The amount of a solvent used for preparing a slurry is such an amount that the concentration of a solid content of the slurry is preferably from 1 to 80% by weight, more preferably from 5 to 75% by weight, and still more preferably from 10 to 70% by weight from a viewpoint of dispersing a binder in the slurry uniformly.

A method or the order for dispersing or dissolving an electrode active material and a binder, and a water-insoluble polysaccharide polymer fiber, a water-soluble polymer, and a conductive material added as necessary in a solvent is not particularly limited. Examples thereof include a method for adding and mixing an electrode active material, a binder, a water-insoluble polysaccharide polymer fiber, a water-soluble polymer, and a conductive material to a solvent, a method for dissolving a water-soluble polymer in a solvent, then adding and mixing an electrode active material, a water-insoluble polysaccharide polymer fiber, and a conductive material, and finally adding and mixing a binder dispersed in a solvent (for example, a latex), and a method for adding and mixing an electrode active material, a water-insoluble polysaccharide polymer fiber, and a conductive material to a binder dispersed in a solvent, and adding and mixing a water-soluble polymer dissolved in a solvent to this mixture.

Examples of a mixing apparatus include a ball mill, a sand mill, a bead mill, a pigment dispersing machine, a grinder, an ultrasonic dispersing machine, a homogenizer, a homomixer, and a planetary mixer. Mixing is preferably performed at room temperature to 80° C. for 10 minutes to a few hours.

Subsequently, the resulting composite particle slurry is spray-dried to be granulated. Spray drying is a method for spraying a slurry in a hot air to dry the slurry. Examples of an apparatus used for spraying a slurry include an atomizer. Examples of the atomizer include a rotating disk type atomizer, a cup type atomizer, a two-fluid nozzle type atomizer, and a pressurization type atomizer. In the rotating disk type atomizer and the cup type atomizer, a slurry is introduced into a substantially central portion of a disk rotating at a high speed, the slurry is emitted to the outside of the disk due to a centrifugal force of the disk, and the slurry is atomized at that time. In the rotating disk type atomizer, the rotational speed of the disk depends on the size of the disc, but is preferably from 5,000 to 30,000 rpm, and more preferably from 15,000 to 30,000 rpm. As the rotational speed of the disk is lower, a sprayed droplet is larger, and an average particle diameter of obtained composite particles is larger. Examples of the rotating disk type atomizer include a pin type atomizer and a vane type atomizer, but the pin type atomizer is preferable. The pin type atomizer is one type of centrifugal spraying apparatus using a spraying plate, and the spraying plate is constituted by a plurality of detachable spraying rollers disposed substantially concentrically along a periphery thereof between upper and lower disks attached. The composite particle slurry is introduced from the center of the spraying plate, is attached to the spraying rollers by a centrifugal force, is moved to the outside on surfaces of the rollers, and is finally detached from the surfaces of the rollers to be sprayed.

The cup type atomizer used for the cup type is configured such that a composite particle slurry is introduced into a cup at a tip of the atomizer rotating at a predetermined rotational speed, the composite particle slurry is ejected from an end of the cup while a rotational force is applied to the composite particle slurry, and the composite particle slurry is thereby sprayed by a centrifugal force to obtain a mist-like droplet. There are a cup upward and a cup downward. However, the cup is not limited to any one of the cups, but both of the cups can perform atomization satisfactorily.

The rotational speed of the disk or the cup in the rotating disk type atomizer or the cup type atomizer is not particularly limited, but is preferably from 5,000 to 40,000 rpm, and more preferably from 15,000 to 30,000 rpm. As the rotational speed of the disk or the cup is lower, a sprayed droplet is larger, and an average particle diameter of composite particles obtained is larger.

The pressurization type atomizer applies a pressure to a composite particle slurry, atomizes the composite particle slurry from a nozzle, and dries the composite particle slurry.

The temperature of the composite particle slurry to be sprayed is preferably room temperature, but may be a temperature higher than room temperature by warming or heating. Also, the hot air temperature during spray drying is preferably from 25 to 250° C., more preferably from 50 to 200° C., and still more preferably from 80 to 150° C. In the spray drying method, a method for blowing hot air is not particularly limited. Examples thereof include a method in which hot air and a sprayed droplet flow in parallel with each other in a lateral direction, a method in which spraying is performed at a drying tower top and a sprayed droplet goes down along with hot air, a method in which a sprayed droplet and hot air are in contact with each other in a counter-current flow, and a method in which a sprayed droplet first flows in parallel with hot air, then falls by gravity, and is in contact with the hot air in a counter-current flow.

(Classification)

In the present invention, granulated particles obtained by spray drying are preferably further classified. A classification method is not particularly limited. However, examples thereof include a dry classification method such as gravity classification, inertial classification, or centrifugal classification; a wet classification method such as sedimentation classification, mechanical classification, or hydraulic classification; a sieving classification method using a sieve net such as a vibration sieve or a plane motion sieve. Among these methods, the sieving classification method is preferable.

(Spray Solidification Granulation Method)

A case where the composite particles of the present invention are manufactured by the spray solidification granulation method will be described below.

The spray solidification granulation method is a granulation method for bringing droplets generated by spraying a liquid or a slurry into contact with a solidification liquid to obtain spherical or granular solid particles (composite particles).

When the composite particles are manufactured by the spray solidification granulation method, first, a composite particle slurry (hereinafter, also referred to as "slurry") containing an electrode active material and a binder, and a water-insoluble polysaccharide polymer fiber, a water-soluble polymer, and a conductive material added as necessary is prepared. The composite particle slurry can be prepared by dispersing or dissolving an electrode active material and a binder, and a water-insoluble polysaccharide polymer fiber, a water-soluble polymer, and a conductive material added as necessary in a solvent. Note that, in this case, a binder dispersed in a solvent can be added in a state of being dispersed in the solvent.

As the solvent used to obtain a composite particle slurry used in the spray solidification granulation method, water is preferably used. However, a mixed solvent of water and an organic solvent may be used, or only an organic solvent may be used singly or in combination of several kinds thereof. Examples of the organic solvent which can be used in this case include an alcohol such as methyl alcohol, ethyl alcohol, or propyl alcohol; an alkyl ketone such as acetone or methyl ethyl ketone; an ether such as tetrahydrofuran, dioxane, or diglyme; and an amide such as diethylformamide, dimethyl acetamide, N-methyl-2-pyrrolidone, or dimethyl imidazolidinone. When an organic solvent is used, an alcohol is preferable. By using water together with an organic solvent having a boiling point lower than that of water, a drying speed can be increased during drying. In addition, the viscosity or flowability of the composite particle slurry can be thereby adjusted, and a production efficiency can be improved.

The viscosity of the composite particle slurry used in the spray solidification granulation method is preferably 1000 mPa·s or less, more preferably 500 mPa·s or less, and still more preferably 300 mPa·s or less at room temperature at a shearing speed of 100 $s^{-1}$. When the viscosity of the composite particle slurry at a shearing speed of 100 $s^{-1}$ is within the above range, the size of a droplet can be reduced using a shearing force in a step of generating a droplet by spraying the slurry. In addition, when the viscosity is within the above range, the slurry can be fed stably until reaching a spraying portion. As a result, productivity of granulation of the composite particles is improved.

The viscosity of the slurry at a shearing speed of 100 $s^{-1}$ can be measured with a coaxial double cylindrical viscometer.

The amount of a solvent used for preparing a slurry is such an amount that the concentration of a solid content of the slurry is preferably from 1 to 80% by weight, more preferably from 5 to 75% by weight, and still more preferably from 10 to 70% by weight from a viewpoint of dispersing a binder in the slurry uniformly.

A method or the order for dispersing or dissolving an electrode active material and a binder, and a water-insoluble polysaccharide polymer fiber, a water-soluble polymer, and a conductive material added as necessary in a solvent is not particularly limited. Examples thereof include a method for adding and mixing an electrode active material, a binder, a water-insoluble polysaccharide polymer fiber, a water-soluble polymer, and a conductive material to a solvent, a method for dissolving a water-soluble polymer in a solvent, then adding and mixing an electrode active material, a water-insoluble polysaccharide polymer fiber, and a conductive material, and finally adding and mixing a binder dispersed in a solvent (for example, a latex), and a method for adding and mixing an electrode active material, a water-insoluble polysaccharide polymer fiber, and a conductive material to a binder dispersed in a solvent, and adding and mixing a water-soluble polymer dissolved in a solvent to this mixture.

Examples of a mixing apparatus include a ball mill, a sand mill, a bead mill, a pigment dispersing machine, a grinder, an ultrasonic dispersing machine, a homogenizer, a homomixer, and a planetary mixer. Mixing is preferably performed at room temperature to 80° C. for 10 minutes to a few hours.

(Spraying Method)

A method for spraying the composite particle slurry in the spray solidification granulation method is not particularly limited, but the composite particle slurry is preferably sprayed by electrostatic spraying or rotary atomization.

(Electrostatic Spraying)

Electrostatic spraying is a method for generating a droplet from a composite particle slurry by using an electrostatic atomization method and spraying the droplet toward a solidification liquid. The electrostatic atomization method is a method for applying a high voltage of several kV or more to an atomizer nozzle, promoting disruption of a composite particle slurry fed to the atomizer nozzle by concentrating charges at a tip of the atomizer nozzle, and generating a droplet formed of the composite particle slurry.

By changing a voltage applied to the atomizer nozzle, a uniform droplet having a size of several hundred μm to several μm can be generated and sprayed.

In addition, by sharpening a tip of a nozzle into a needle-like shape, charges can be concentrated at the tip of the atomizer nozzle, and generation of a droplet can be promoted in the electrostatic atomization method. By devising the shape of a tip of a nozzle, it is possible to set an application voltage required for manufacturing a composite particle group having a particle diameter distribution within a desired range to a low value, and this is advantageous for apparatus cost, running cost, and safety in operation.

An application voltage suitable for generation of a droplet is not particularly limited because the application voltage depends on the shape of a tip of an atomizer nozzle, surface tension, viscosity, a solid concentration, a feed speed, and conductivity of a composite particle slurry, electrostatic capacity which an active material can accumulate, and the shape or installation position of a ground electrode which can be installed near the atomizer nozzle, described below. However, the application voltage is usually 2 kV or more. Those skilled in the art can generate a droplet having a desired size by appropriately examining a voltage condition suitable for generation of a droplet considering these factors.

Here, the temperature of the slurry fed to the atomizer nozzle is usually room temperature, but may be higher than room temperature by raising the temperature in accordance with a condition or an object.

In addition, a ground electrode is preferably disposed just below the tip of the nozzle so as to face the atomizer nozzle. The shape of the ground electrode is not particularly limited, but can be appropriately selected. However, for example, the ground electrode is preferably formed into a ring shape. By disposing the ground electrode just below the atomizer nozzle, generation of a droplet by the electrostatic atomization can be further promoted.

(Rotary Atomization)

Rotary atomization is a method for spraying a droplet toward a solidification liquid using a rotary atomization atomizer as a spraying machine. Here, as the rotary atomization atomizer, a rotating disk type atomizer and a cup type atomizer can be preferably used, and the cup type atomizer is more preferably used.

The cup type atomizer is configured such that a composite particle slurry is introduced into a cup at a tip of the atomizer rotating at a predetermined rotational speed, the composite particle slurry is ejected from an end of the cup while a rotational force is applied to the composite particle slurry, and the composite particle slurry is thereby sprayed by a centrifugal force to obtain a mist-like droplet. There are a cup upward and a cup downward. However, the cup is not limited to any one of the cups, but both of the cups can perform atomization satisfactorily.

In the rotating disk type atomizer, a composite particle slurry is introduced into a substantially central portion of a disk rotating at a high speed, the slurry is emitted to the outside of the disk due to a centrifugal force of the disk, and the slurry is atomized at that time. Examples of the rotating disk type atomizer include a pin type atomizer, a vane type atomizer, and a kesner type atomizer, but the pin type atomizer is preferable. The pin type atomizer is one type of centrifugal spraying apparatus using a spraying plate, and the spraying plate is constituted by a plurality of detachable spraying rollers disposed substantially concentrically along a periphery thereof between upper and lower disks attached. The composite particle slurry is introduced from the center of the spraying plate, is attached to the spraying rollers by a centrifugal force, is moved to the outside on surfaces of the rollers, and is finally detached from the surfaces of the rollers to be sprayed.

The rotational speed of the cup or the disk in the rotary atomization method is not particularly limited, but is preferably from 5,000 to 40,000 rpm, and more preferably from 15,000 to 30,000 rpm. As the rotational speed of the cup or the disk is lower, a sprayed droplet is larger, and an average particle diameter of obtained composite particles is larger.

In addition, when a droplet generated by rotary atomization is brought into contact with a solidification liquid, a distance between a spraying position of the droplet and a liquid surface of the solidification liquid is preferably 30 cm or more, more preferably 50 cm or more, and still more preferably 60 cm or more in view of obtaining composite particles having a high sphericity. A too short distance may deform composite particles due to collision between the solidification liquid and the droplet.

The temperature of the composite particle slurry to be sprayed is preferably room temperature, but may be a temperature higher than room temperature by warming or heating.

(Solidification Method)

By bringing the droplet obtained by the above spraying method such as electrostatic spraying or rotary atomization into contact with a solidification liquid, spherical or granular composite particles can be obtained. The composite particles generated in the solidification liquid can be separated from the solidification liquid by filtration or the like. A filtration method is not particularly limited, but natural filtration, pressure filtration, and vacuum filtration can be employed. Also, filtration using a filtration filter, scraping filtration, sieving filtration, or the like can be also employed. Further, in a case of sieving filtration, filtration may be performed using a sieve having a predetermined opening in a solidification liquid containing composite particles.

In addition, the composite particles separated from the solidification liquid are preferably dried. A drying method is not particularly limited, but examples thereof include drying with warm air, hot air, or low humidity air, vacuum drying, and a drying method by irradiation with a (far)infrared ray, an electron beam, or the like. Drying time is preferably from 5 to 30 minutes. A drying temperature depends on heat resistance of a material used, but is from 30 to 180° C., for example. A too high drying temperature may cause the composite particles to adhere to one another to form a coarse particle.

In addition, a water washing step of adding water to the composite particles separated from the solidification liquid, stirring the resulting solution again, and further subjecting the resulting solution to filtration or the like may be performed predetermined times. The composite particles which have been separated from the solidification liquid or have been subjected to the water washing step are preferably dried by vacuum drying or the like.

Here, as the solidification liquid, a low pH acidic liquid to solidify a water-soluble polymer contained in a slurry, an aqueous divalent or trivalent metal salt solution, or an aqueous cationic polymer solution can be used. The aqueous divalent or trivalent metal salt solution or the aqueous cationic solution is particularly preferably used. As the aqueous divalent or trivalent metal salt solution, an aqueous solution of an inorganic salt such as calcium chloride, magnesium sulfate, zinc sulfate, copper sulfate, aluminum nitrate, barium chloride, magnesium chloride, ferric chloride, ferric sulfate, aluminum sulfate, or iron alum is preferably used, an aqueous solution of calcium chloride, magnesium sulfate, zinc sulfate, copper sulfate, aluminum nitrate, barium chloride, ferric chloride, or ferric sulfate is more preferably used, and an aqueous solution of calcium chloride or magnesium sulfate is still more preferably used from a viewpoint of easily solidifying a composite particle slurry in a form of droplets and obtaining spherical composite particles and from a viewpoint of hardly causing bonding between solidified particles after solidification. By using a solvent to easily solidify a specific water-soluble polymer as a solidification liquid, bonding between solidified particles to one another can be suppressed. When an anionic water-soluble polymer is used as a water-soluble polymer, an acidic solidification liquid may be used. In this case, the value of pH is preferably 5 or less, and solidification with a volatile acidic liquid makes removal of a solidification liquid component easy.

When the aqueous divalent or trivalent metal salt solution is used as the solidification liquid, the concentration of the divalent or trivalent metal salt is preferably from 0.4 to 20% by weight, more preferably from 0.5 to 15% by weight, and still more preferably from 1.0 to 10% by weight from a viewpoint of solidifying a droplet of a slurry firmly and obtaining composite particles having an excellent shape. A too high concentration of the divalent or trivalent metal salt deteriorates a characteristic of an obtained electrochemical device, and deteriorates adhesion between an electrode active material layer and a current collector. A too low concentration of the divalent or trivalent metal salt may prevent solidification of a slurry in a form of a droplet, or may make composite particles obtained brittle.

Also, preferable examples of the aqueous cationic polymer solution include aqueous solutions of polyethylene imine, polyvinyl amine, polyvinyl pyridine, polyamine sulfone, polyallyl amine, polyacrylamide, polydiallyl methyl amine, polyamido amine, a polyacrylic (methacrylic) acid ester, polyamino alkyl acrylamide, polyepoxy amine, polyamide polyamine, polyester polyamine, chitosan, diallyl ammonium chloride sulfur dioxide copolymer, diallyl methyl ethyl ammonium ethylsulfate-sulfur dioxide copolymer, diallyldimethyl ammonium chloride-acrylamide copolymer, a polymer of a dicyandiamide-formalin condensate or a polyalkylene polyamine-dicyandiamide condensate and salts thereof, and a quaternary ammonium salt such as polydiallyldimethylammonium chloride, polyvinyl pyridinium chloride, or polymethacrylic acid ester methyl chloride. More preferable examples thereof include aqueous solutions of polyethylene imine, polyvinyl amine, polyamine sulfone, polyallyl amine, polyacrylamide, polydiallyl methyl amine, polyamido amine, a polyacrylic (methacrylic) acid ester, polyamino alkyl acrylamide, polyamide polyamine, polyester polyamine, diallyl ammonium chloride sulfur dioxide copolymer, diallyl methyl ethyl ammonium ethylsulfate-sulfur dioxide copolymer, diallyldimethylammonium chloride-acrylamide copolymer, polymer of a dicyandiamide-formalin condensate or a polyalkylene polyamine-dicyandiamide condensate and salts thereof, and a quaternary ammonium salt such as polydiallyldimethylammonium chloride or polyacrylic(methacrylic) acid ester methyl chloride. Still more preferable examples thereof include aqueous solutions of polyethylene imine, polyacrylamide, a polyacrylic (methacrylic) acid ester, a quaternary ammonium salt such as polyacrylic(methacrylic) acid ester methyl chloride, diallyl ammonium chloride sulfur dioxide copolymer, diallyl methyl ethyl ammonium ethylsulfate-sulfur dioxide copolymer, and diallyldimethylammonium chloride-acrylamide copolymer.

A cationic polymer contained in the aqueous cationic polymer solution may be used singly or in combination of two or more kinds thereof at any ratio.

When the aqueous cationic polymer solution is used as the solidification liquid, the concentration of the cationic polymer is preferably from 0.4 to 20% by weight, more preferably from 0.5 to 15% by weight, and still more preferably from 1.0 to 10% by weight from a viewpoint of solidifying a droplet of a slurry firmly and obtaining composite particles having an excellent shape. A too high concentration of the cationic polymer deteriorates adhesion between an electrode active material layer and a current collector. A too low concentration of the cationic polymer may prevent solidification of a slurry in a form of a droplet, or may make obtained composite particles brittle.

(Physical Properties of Composite Particles)

The shape of each of the composite particles of the present invention is preferably substantially spherical from a viewpoint of flowability. That is, when the short axis diameter of each of the composite particles is $L_s$, the long axis diameter thereof is $L_1$, $L_a=(L_s+L_1)/2$ is defined, and a value of $(1-(L_1-L_s)/L_a)\times 100$ is a sphericity (%), the sphericity is preferably 80% or more, and more preferably 90% or more. Here, the short axis diameter $L_s$ and the long axis diameter $L_1$ are values measured based on a photographic image with a scanning electron microscope.

As for the particle diameter of each of the composite particles of the present invention, a cumulative 10% diameter (D10 diameter) is preferably 20 μm or more and 100 μm or less, more preferably 25 μm or more and 80 μm or less, and still more preferably 30 μm or more and 60 μm or less in a particle diameter distribution in terms of a volume obtained by a particle diameter measurement using a laser diffraction method. In the particle diameter distribution in terms of a volume, a too large cumulative 10% diameter (D10 diameter) makes it impossible to obtain a thin film, and a too small cumulative 10% diameter (D10 diameter) may cause the particles to be blown up during transportation. Note that the particle diameter distribution is obtained by performing measurement using a laser diffraction particle size distribution measuring apparatus (for example, SALD-3100; manufactured by Shimadzu Corporation, Microtrac MT-3200II; manufactured by Nikkiso Co., Ltd.).

The composite particles of the present invention have a dynamic repose angle of 20° or more and less than 40°, preferably of 25° or more and less than 40°, and more preferably of 25° or more and less than 35°. A too large dynamic repose angle deteriorates a film thickness precision of an electrode due to a poor flowability. A too small dynamic repose angle makes pressurization difficult due to a too good flowability.

Here, the dynamic repose angle means an angle of an inclined powder surface with respect to a horizontal surface, and means an angle of repose in a dynamic equilibrium state. The inclined powder surface is formed in a cylindrical container when a powder is put into the cylindrical container, and the container is rotated around a cylinder axis at a constant speed while the cylinder axis is horizontal.

In the present invention, examples of factors to control the dynamic repose angle of the composite particles include a particle diameter of each of the composite particles, a particle size distribution, the amount of a binder in the composite particles, and a glass transition temperature (Tg) of the binder. Composite particles having a small particle diameter have a larger surface area than those having a large particle diameter, and therefore have a larger adhesive force. Accordingly, the dynamic repose angle is larger. Composite particles having a wide particle size distribution contain many particles having a small particle diameter if a central particle diameter is the same, and therefore the composite particles have a large dynamic repose angle. Composite particles having a large amount of a binder contains a larger content of an adhesive component, and therefore flowability of the composite particles deteriorates and a dynamic repose angle thereof becomes large. When the glass transition temperature (Tg) of a binder is low, an adhesive function at a normal temperature is high, and therefore the flowability of the composite particles is deteriorated. Accordingly, the dynamic repose angle is large.

A pressure loss of a composite particle layer formed of the composite particles of the present invention is 5 mbar or less, preferably 4 mbar or less, and more preferably 3 mbar or less. A too large pressure loss deteriorates an electrolytic solution injection property of an electrode manufactured using the composite particles.

In the present invention, a pressure loss of a composite particle layer can be determined as a pressure difference before and after passing of the air, obtained by compressing the composite particle layer at a constant pressure using a mesh-like piston and causing the air to pass through the compressed composite particle layer.

Specifically, when composite particles are stacked into a composite particle layer so as to have a height of 40 mm, the composite particle layer is compressed with a force of 10 kPa, and the air of 2 m/s was caused to pass through the compressed composite particle layer, composite particles having a pressure difference (pressure loss) between before and after passing of the air within the above range correspond to the composite particles of the present invention.

Note that the pressure loss can be measured with a powder flowability analyzer (for example, powder rheometer FT4; manufactured by Freeman Technology Co., Ltd.).

(Electrochemical Device Electrode)

By laminating an electrode active material layer containing the composite particles for an electrochemical device electrode according to the present invention on a current collector, an electrochemical device electrode can be obtained. Examples of a material of a current collector include metal, carbon, and a conductive polymer. Metal is preferably used. Examples of the metal include copper, aluminum, platinum, nickel, tantalum, titanium, stainless steel, and an alloy. Among these metals, copper, aluminum, or an aluminum alloy is preferably used in view of conductivity and voltage resistance. In addition, when a high voltage resistance is required, high-purity aluminum disclosed in JP 2001-176757 A or the like can be suitably used. The current collector has a shape of a film or a sheet. The thickness thereof is appropriately selected according to intended use, but is preferably from 1 to 200 μm, more preferably from 5 to 100 μm, and still more preferably from 10 to 50 μm.

When an electrode active material layer is stacked on a current collector, composite particles may be molded into a sheet shape, and then may be laminated on a current collector. However, it is preferable to subject composite particles to pressure molding directly on a current collector. Examples of the pressure molding method include a roll pressure molding method for molding an electrode active material layer on a current collector by feeding composite particles to a roll type pressure molding apparatus having a pair of rolls with a feeding apparatus such as a screw feeder while the current collector is conveyed with the rolls, a method for scattering composite particles on a current collector, adjusting the thickness by flattening the composite particles with a blade or the like, and then molding the composite particles with a pressure apparatus, and a method for filling a mold with composite particles, and molding the composite particles by applying a pressure to the mold. Among these methods, the roll pressure molding method is preferable. Particularly, the composite particles of the present invention have a high flowability. Therefore, molding by roll pressure molding is possible due to the high flowability, and productivity can be thereby improved.

The roll temperature for performing roll pressure molding is preferably from 25 to 200° C., more preferably from 50 to 150° C., and still more preferably from 80 to 120° C. from a viewpoint of obtaining a sufficient adhesion between an electrode active material layer and a current collector. In addition, the press linear pressure between rolls during roll pressure molding is preferably from 10 to 1000 kN/m, more preferably from 200 to 900 kN/m, and still more preferably from 300 to 600 kN/m from a viewpoint of improving uniformity of the thickness of an electrode active material layer. Also, the molding speed during roll pressure molding is preferably from 0.1 to 20 m/min, and more preferably from 4 to 10 m/min.

Further, in order to prevent variation in the thickness of a molded electrochemical device electrode, to increase the density of an electrode active material layer, and to increase a capacity, post-pressurization may be further performed, as necessary. Post-pressurization is preferably performed in a pressing step with rolls. In the roll-pressing step, a pressure is applied by arranging two cylindrical rolls up and down in parallel with each other with a narrow spacing, rotating the rolls in the opposite direction to each other, and causing an electrode to bite into the rolls. In this case, the temperature of the rolls may be adjusted, as necessary, for example, by heating or cooling the rolls. The thickness of the electrode active material layer is not particularly limited, but is usually from 5 to 1000 μm, preferably from 20 to 500 μm, and more preferably from 30 to 300 μm.

(Electrochemical Device)

An electrochemical device can be obtained by using the electrochemical device electrode obtained as described above as a positive electrode or a negative electrode, and further including a separator and an electrolytic solution. Examples of the electrochemical device include a lithium ion secondary battery and a lithium ion capacitor.

(Separator)

Examples of the separator include a microporous film or a nonwoven fabric containing a polyolefin resin such as polyethylene or polypropylene, or an aromatic polyamide resin; and a porous resin coating containing inorganic ceramic powder. Specific examples thereof include a microporous film formed of a resin such as polyolefin (polyethylene, polypropylene, polybutene, polyvinyl chloride), a mixture thereof, or a copolymer thereof; a microporous film formed of a resin such as polyethylene terephthalate, paolycycloolefin, polyether sulfone, polyamide, polyimide, polyimide amide, polyaramide, nylon, or polytetrafluoroethylene; a product obtained by weaving a polyolefin fiber or a non-woven fabric thereof; and an assembly of insulating material particles. Among these materials, a microporous film formed of a polyolefin resin is preferable because the film thickness of the entire separator can be reduced, and an active material ratio in a lithium ion secondary battery can be raised to increase a capacity per volume.

The thickness of the separator is preferably from 0.5 to 40 µm, more preferably from 1 to 30 µm, and still more preferably from 1 to 25 µm from a viewpoint of reducing an internal resistance due to the separator in a lithium ion secondary battery and from a viewpoint of excellent workability in manufacturing a lithium ion secondary battery.

(Electrolytic Solution)

Examples of an electrolytic solution for a lithium ion secondary battery include a nonaqueous electrolytic solution obtained by dissolving a supporting electrolyte in a nonaqueous solvent. As the supporting electrolyte, a lithium salt is preferably used. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among these lithium slats, $LiPF_6$, $LiClO_4$, and $CF_3SO_3Li$ which are easily dissolved in a solvent and exhibit a high dissociation degree are preferable. These lithium salts may be used singly or in combination of two or more kinds thereof at any ratio. Use of a supporting electrolyte having a higher dissociation degree makes a lithium ion conductivity higher. Therefore, the lithium ion conductivity can be adjusted with the kind of the supporting electrolyte.

The concentration of the supporting electrolyte in the electrolytic solution is preferably from 0.5 to 2.5 mol/L according to the kind of the supporting electrolyte. The supporting electrolyte having a too high or too low concentration may reduce the ion conductivity.

The nonaqueous solvent is not particularly limited as long as being able to dissolving the supporting electrolyte. Examples of the nonaqueous solvent include a carbonate such as dimethyl carbonate (DMC), ethylene carbonate (EC), diethyl carbonate (DEC), propylene carbonate (PC), butylene carbonate (BC), or methylethyl carbonate (MEC); an ester such as γ-butyrolactone or methyl formate; an ether such as 1,2-dimethoxy ethane or tetrahydrofuran; a sulfur-containing compound such as sulfolane or dimethyl sulfoxide; and an ionic liquid also used as a supporting electrolyte. Among these solvents, a carbonate is preferable because of a high dielectric constant and a wide stable potential region. The nonaqueous solvents may be used singly or in combination of two or more kinds thereof at any ratio. In general, a nonaqueous solvent having a lower viscosity makes a lithium ion conductivity higher, and a nonaqueous solvent having a higher dielectric constant makes the solubility of a supporting electrolyte higher. However, there is a trade-off relation therebetween. Accordingly, it is preferable to use a nonaqueous solvent by adjusting the lithium ion conductivity with the kind of a solvent or a mixing ratio thereof. In addition, a product obtained by replacing all the hydrogen atoms or a part thereof in a nonaqueous solvent with fluorine atoms may be used partially or as a whole.

In addition, the electrolytic solution may contain an additive. Examples of the additive include a carbonate such as vinylene carbonate (VC); a sulfur-containing compound such as ethylene sulfite (ES); and a fluorine-containing compound such as fluoroethylene carbonate (FEC). The additives may be used singly or in combination of two or more kinds thereof at any ratio.

Note that, as an electrolytic solution for a lithium ion capacitor, an electrolytic solution similar to the above-described electrolytic solution which can be used for a lithium ion secondary battery can be used.

(Method for Manufacturing Electrochemical Device)

Specific examples of a method for manufacturing an electrochemical device such as a lithium ion secondary battery or a lithium ion capacitor include a method for overlaying a positive electrode and a negative electrode with a separator interposed therebetween, winding or folding the resulting product according to a battery shape, putting the resulting product in a battery container, injecting an electrolytic solution into the battery container, and sealing an opening of the battery container. An expand metal; an overcurrent prevention element such as a fuse or a PTC element; a lead plate; or the like may be further put therein as necessary to prevent an increase in pressure in the battery, overcharge and overdischarge. The shape of the lithium ion secondary battery may be a coin type, a button type, a sheet type, a cylinder type, a square type, a flat type, or the like. A material of the battery container is only required to prevent water from entering the battery, and may be metal, an aluminum laminate, or the like without any particular limitation.

The composite particles for an electrochemical device electrode according to the present invention can form an electrode having an excellent film thickness precision and electrolytic solution injection property. In addition, this electrode has a small spread of the electrode after pressing.

EXAMPLES

Hereinafter, the present invention will be described specifically by showing Examples. However, the present invention is not limited to the following Examples, but can be performed by any modification in a range not departing from the abstract of the present invention and a scope equal thereto. Note that, "%" and "part" indicating the amount in the following description are based on the weight unless otherwise specified.

In Examples and Comparative Examples, measurement of a dynamic repose angle, a pressure loss, and a particle diameter distribution, and evaluation for a film thickness precision, spread of an electrode, and an electrolytic solution injection property were performed as follows. <Measurement of Dynamic Repose Angle>

Composite particles obtained in each of Examples and Comparative Examples were put into a cylindrical container, the container was rotated around a cylinder axis at a constant speed while the cylinder axis was horizontal, and an angle of an inclined powder surface formed in the cylindrical container with respect to a horizontal surface was measured. Specifically, 100 cc of composite particles was put into a cylindrical container having a diameter of 120 mm and a width of 40 mm, and then the cylindrical container was rotated at a rotational speed of 10 rpm. At this time, an angle of a powder surface with respect to a horizontal surface was measured.

<Measurement of Pressure Loss>

Composite particles obtained in each of Examples and Comparative Examples were filled into a sample tube having a diameter of 50 mm such that the height of a composite particle layer was 40 mm. Thereafter, the composite particle layer was compressed with a force of 10 kPa using a mesh-like piston, and the air of 2 m/s was caused to pass therethrough. Pressures before and after passing of the air through the composite particle layer were measured, and a difference therebetween was used as a pressure loss. The pressure loss of the composite particle layer was measured with a powder rheometer FT4 (manufactured by Freeman Technology Co., Ltd.).

<Measurement of Particle Diameter Distribution>

The particle diameter distribution of composite particles was measured using a dry laser diffraction scattering particle size distribution analyzer (manufactured by Nikkiso Co., Ltd.: Microtrac MT-3200II).

<Film Thickness Precision>

A lithium ion secondary battery electrode obtained in each of Examples and Comparative Examples was cut into a size of 50 mm×50 mm, and was divided into a 10 mm square (25 regions). The thicknesses in 25 regions were measured, a difference between a maximum value and a minimum value was determined, and evaluation was performed according to the following criteria. Table 1 indicates results thereof.

A: less than 1 μm
B: 1 μm or more and less than 2 μm
C: 2 μm or more and less than 4 μm
D: 4 μm or more <Spread of Electrode>

Composite particles obtained in Examples and Comparative Examples were scattered on a PET film having a thickness of 50 μm. Thereafter, the resulting product was squeeged using a doctor blade having a width of 50 mm and a spacing of 300 μm, was flattened, and then was pressed. A difference between an electrode width after pressing and a doctor blade width was determined, and evaluation was performed according to the following criteria. Table 1 indicates results thereof.

A: less than 0.3 mm
B: 0.3 mm or more and less than 0.5 mm
C: 0.5 mm or more and less than 1.0 mm
D: 1.0 mm or more <Electrolytic Solution Injection Property>

To a lithium ion secondary battery electrode manufactured in each of Examples and Comparative Examples, 2 μL of an electrolytic solution (solvent: EC/DEC=1/2, electrolyte: $LiPF_6$ having a concentration of 1 mol/L) was dropwise added. Time was measured after the electrolytic solution was dropwise added until droplets disappeared completely, and evaluation was performed according to the following criteria. Table 1 indicates results thereof. A shorter time until droplets disappear indicates a higher electrolytic solution injection property.

A: less than 1 minute
B: 1 minute or more and less than 5 minutes
C: 5 minutes or more and less than 10 minutes
D: 10 minutes or more Example 1

(Preparation of Composite Particle Slurry)

97 parts of artificial graphite (average particle diameter: 24.5 μm, graphite interlayer distance (spacing (d value) of (002) plane by X-ray diffraction method): 0.354 nm) as an electrode active material, 2 parts of an SBR aqueous dispersion (BM400B, glass transition temperature (Tg): −5° C.; manufactured by Zeon Corporation) in terms of a solid content as a binder, 0.5 parts of carboxymethylcellulose (BSH-12; manufactured by DKS Co. Ltd.) (hereinafter also referred to as "CMC") in terms of a solid content as a water-soluble polymer, and 0.5 parts of a 2% cellulose nanofiber aqueous dispersion (BiNFi-s (NMa-10002), raw material: softwood, polymerization degree: 500; manufactured by Sugino Machine Limited) in terms of a solid content as a water-insoluble polysaccharide polymer fiber were mixed. Ion exchanged water was further added thereto such that the concentration of solid content was 35% by weight. The resulting mixture was mixed and dispersed to obtain a composite particle slurry.

(Manufacturing Composite Particles)

The composite particle slurry was fed to a spray dryer (manufactured by Okawara Kakoki Co., Ltd.) using a pin type atomizer (diameter 84 mm) of a rotating disk type at 255 mL/min. Spray drying granulation was performed under conditions of a rotational speed of 17,000 rpm, a hot air temperature of 150° C., and a particle collection outlet temperature of 90° C.

Subsequently, the composite particles obtained by spray drying were classified. Specifically, using a sieve net having an opening of 45 μm, particles under the sieve net were removed. The particle diameter of each of the composite particles remaining on the sieve net was measured, and the cumulative 10% diameter (D10 diameter) in the particle diameter distribution in terms of a volume was 35 μm. Also, the dynamic repose angle was 28°, and the pressure loss of a composite particle layer was 0.7 mbar.

(Preparation of Lithium Ion Secondary Battery Electrode)

The obtained composite particles were fed to press rolls (roll temperature: 100° C., press linear pressure: 500 kN/m) of a roll press machine ("press cutting rough surface heat roll" manufactured by HIRANO GIKEN KOGYO Co., Ltd.) using a constant feeder ("Nikka spray K-V" manufactured by Nikka Co.). A copper foil having a thickness of 20 μm was inserted between the press rolls. The composite particles fed from the constant feeder were attached onto the copper foil, and were subjected to pressure molding at a molding speed of 1.5 m/min to obtain a lithium ion secondary battery electrode.

Example 2

A composite particle slurry was prepared and composite particles were manufactured in a similar manner to Example 1 except that the amount of a binder used for preparing the composite particle slurry was changed to 3 parts in terms of a solid content. The cumulative 10% diameter (D10 diameter) of the composite particles in the particle diameter distribution in terms of a volume was 35 μm. Also, the dynamic repose angle was 33°, and the pressure loss of a composite particle layer was 0.5 mbar. In addition, a lithium ion secondary battery electrode was prepared in a similar manner to Example 1 except that these composite particles were used.

Example 3

A composite particle slurry was prepared and composite particles were manufactured in a similar manner to Example 1 except that the amount of a binder used for preparing the composite particle slurry was changed to 0.5 parts in terms of a solid content. The cumulative 10% diameter (D10 diameter) of the composite particles in the particle diameter distribution in terms of a volume was 35 μm. Also, the dynamic repose angle was 24°, and the pressure loss of a composite particle layer was 2 mbar. In addition, a lithium ion secondary battery electrode was prepared in a similar manner to Example 1 except that these composite particles were used.

Example 4

A composite particle slurry was prepared and composite particles were manufactured in a similar manner to Example 1 except that the obtained composite particles by spray drying were classified using a sieve net having an opening of 25 μm. The cumulative 10% diameter (D10 diameter) of the composite particles in the particle diameter distribution in terms of a volume was 20 μm. Also the dynamic repose angle was 32°, and the pressure loss of a composite particle layer was 3 mbar. In addition, a lithium ion secondary battery electrode was prepared in a similar manner to Example 1 except that these composite particles were used.

Example 5

A composite particle slurry was prepared and composite particles were manufactured in a similar manner to Example 1 except that the obtained composite particles by spray drying were classified using a sieve net having an opening of 75 μm. The cumulative 10% diameter (D10 diameter) of the composite particles in the particle diameter distribution in terms of a volume was 60 μm. Also, the dynamic repose angle was 21°, and the pressure loss of a composite particle layer was 0.5 mbar. In addition, a lithium ion secondary battery electrode was prepared in a similar manner to Example 1 except that these composite particles were used.

Example 6

(Preparation of Composite Particle Slurry)

91 parts of LiCoO$_2$ (hereinafter also referred to as "LCO") as an electrode active material, 6 parts of acetylene black (HS-100, manufactured by Denki Kagaku Kogyo Co., Ltd.) (hereinafter, also referred to as "AB") as a conductive material, 2 parts of an SBR aqueous dispersion (BM400B, glass transition temperature (Tg): −5° C.; manufactured by Zeon Corporation) in terms of a solid content as a binder, 0.5 parts of carboxymethylcellulose (BSH-12; manufactured by DKS Co. Ltd.) (hereinafter also referred to as "CMC") in terms of a solid content as a water-soluble polymer, and 0.5 parts of a 2% cellulose nanofiber aqueous dispersion as a water-insoluble polysaccharide polymer fiber (BiNFi-s (NMa-10002), raw material: softwood, polymerization degree: 500; manufactured by Sugino Machine Limited) were mixed. Ion exchanged water was further added thereto such that the concentration of solid content was 50% by weight. The resulting mixture was mixed and dispersed to prepare a composite particle slurry.

(Manufacturing Composite Particles)

The composite particle slurry was fed to a spray dryer (manufactured by Okawara Kakoki Co., Ltd.) using a pin type atomizer (diameter 84 mm) of a rotating disk type at 255 mL/min. Spray drying granulation was performed under conditions of a rotational speed of 17,000 rpm, a hot air temperature of 150° C., and a particle collection outlet temperature of 90° C.

Subsequently, the composite particles obtained by spray drying were classified. Specifically, using a sieve net having an opening of 45 μm, particles under the sieve net were removed. The particle diameter of each of the composite particles remaining on the sieve net was measured, and the cumulative 10% diameter (D10 diameter) in the particle diameter distribution in terms of a volume was 30 μm. The dynamic repose angle was 25°, and the pressure loss of a composite particle layer was 0.6 mbar.

(Preparation of Lithium Ion Secondary Battery Electrode)

The obtained composite particles were fed to press rolls (roll temperature: 100° C., press linear pressure: 500 kN/m) of a roll press machine ("press cutting rough surface heat roll" manufactured by HIRANO GIKEN KOGYO Co., Ltd.) using a constant feeder ("Nikka spray K-V" manufactured by Nikka Co.). An aluminum foil having a thickness of 20 μm was inserted between the press rolls. The composite particles fed from the constant feeder were attached onto the aluminum foil, and were subjected to pressure molding at a molding speed of 1.5 m/min to obtain a lithium ion secondary battery electrode.

Comparative Example 1

A composite particle slurry was prepared and composite particles were manufactured in a similar manner to Example 1 except that the obtained composite particles by spray drying were not classified. The cumulative 10% diameter (D10 diameter) of the composite particles in the particle diameter distribution in terms of a volume was 10 μm. Also, the dynamic repose angle was 35°, and the pressure loss of a composite particle layer was 12 mbar. In addition, a lithium ion secondary battery electrode was prepared in a similar manner to Example 1 except that these composite particles were used.

Comparative Example 2

A composite particle slurry was prepared and composite particles were manufactured in a similar manner to Example 1 except that the kind of a binder used for preparing the composite particle slurry was changed to an SBR aqueous dispersion (glass transition temperature (Tg): −40° C.). The cumulative 10% diameter (D10 diameter) of the composite particles in the particle diameter distribution in terms of a volume was 35 μm. Also, the dynamic repose angle was 45°, and the pressure loss of a composite particle layer was 2 mbar. In addition, a lithium ion secondary battery electrode was prepared in a similar manner to Example 1 except that these composite particles were used.

Comparative Example 3

A composite particle slurry was prepared and composite particles were manufactured in a similar manner to Example 1 except that the kind of a binder used for preparing the composite particle slurry was changed to an SBR aqueous dispersion (glass transition temperature (Tg): 40° C.). The cumulative 10% diameter (D10 diameter) of the composite particles in the particle diameter distribution in terms of a volume was 35 μm. Also, the dynamic repose angle was 15°, and the pressure loss of a composite particle layer was 2 mbar. In addition, a lithium ion secondary battery electrode was prepared in a similar manner to Example 1 except that these composite particles were used.

TABLE 1

|  |  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Electrode active material | Kind | Graphite | Graphite | Graphite | Graphite | Graphite | LCO | Graphite | Graphite | Graphite |

TABLE 1-continued

|  |  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Binder | Kind | BM400B | BM400B | BM400B | BM400B | BM400B | BM400B | BM400B | SBR (Low Tg) | SBR (High Tg) |
|  | Amount (part) | 2 | 3 | 0.5 | 2 | 2 | 2 | 2 | 2 | 2 |
| Composite particles | Dynamic repose angle (°) | 28 | 33 | 24 | 32 | 21 | 25 | 35 | 45 | 15 |
|  | Pressure loss (mbsr) | 0.7 | 0.5 | 2 | 3 | 0.5 | 0.6 | 12 | 2 | 2 |
|  | Cumulative 10% diameter (D10 diameter) (μm) | 35 | 35 | 35 | 20 | 60 | 30 | 10 | 35 | 35 |
| Classification | Opening of sieve net (μm) | 45 | 45 | 45 | 25 | 75 | 45 | None | 45 | 45 |
| Evaluation item | Film thickness precision | A | B | A | B | B | A | A | D | B |
|  | Spread of electrode | A | A | B | A | A | A | A | A | D |
|  | Electrolytic solution injection property | A | A | A | B | A | A | D | A | A |

As described above, when a composite particle layer formed of composite particles for an electrochemical device electrode, containing an electrode active material and a binder has a pressure loss of 5.0 mbar or less and a dynamic repose angle of 20° or more and less than 40°, an obtained electrode therewith has an excellent film thickness precision and electrolytic solution injection property and a small spread of the electrode after pressing.

The invention claimed is:

1. A method for producing composite particles for an electrochemical device electrode, wherein the composite particles comprising an electrode active material and 0.1 to 10 parts by weight of a binder relative to 100 parts by weight of the electrode active material based on a dry weight, the binder having a glass transition temperature of −30 to 30° C., the method comprising:
    preparing a composite particle slurry containing the electrode active material and the binder;
    adjusting a viscosity of the composite particle slurry;
    drying the composite particle slurry to obtain granulated particles; and
    classifying the granulated particles to obtain the composite particles having a cumulative 10% diameter (D10 diameter) of 20 μm or more and 100 μm or less in a particle diameter distribution in terms of a volume,
    wherein the composite particles as a powder have a pressure loss of 5.0 mbar or less and a dynamic repose angle of 20° or more and less than 40°,
    wherein the pressure loss is determined by stacking the composite particles into a composite particle layer having a height of 40 mm, compressing the composite particle layer at a force of 10 kPa, passing an air at 2 m/s through the compressed composite particle layer, and measuring a pressure difference before and after passing of the air through the compressed composite particle layer to give the pressure loss.

2. The method for producing composite particles for an electrochemical device electrode according to claim 1, wherein the particles comprise a water-insoluble polysaccharide polymer fiber.

3. The method for producing composite particles for an electrochemical device electrode according to claim 1, wherein the viscosity of the composite particle slurry is adjusted to 10 mPa·s or more and 3,000 mPa·s or less, and the composite particle slurry is dried by a spray drying granulation method.

4. The method for producing composite particles for an electrochemical device electrode according to claim 1, wherein the viscosity of the composite particle slurry is adjusted to 1,000 mPa·s or less, and the composite particle slurry is dried by a spray solidification granulation method.

5. The method for producing composite particles for an electrochemical device electrode according to claim 1, wherein the composite particles have the dynamic repose angle of 25° or more and less than 35°.

6. The method for producing composite particles for an electrochemical device electrode according to claim 1, wherein the dynamic repose angle of the composite particles is controlled by at least one of a particle diameter of each of the composite particles, a particle size distribution, the amount of a binder in the composite particles, and the glass transition temperature of the binder.

* * * * *